(No Model.)  2 Sheets—Sheet 1.
G. CROMPTON.
Shedding Mechanism for Looms.
No. 239,939.   Patented April 12, 1881.
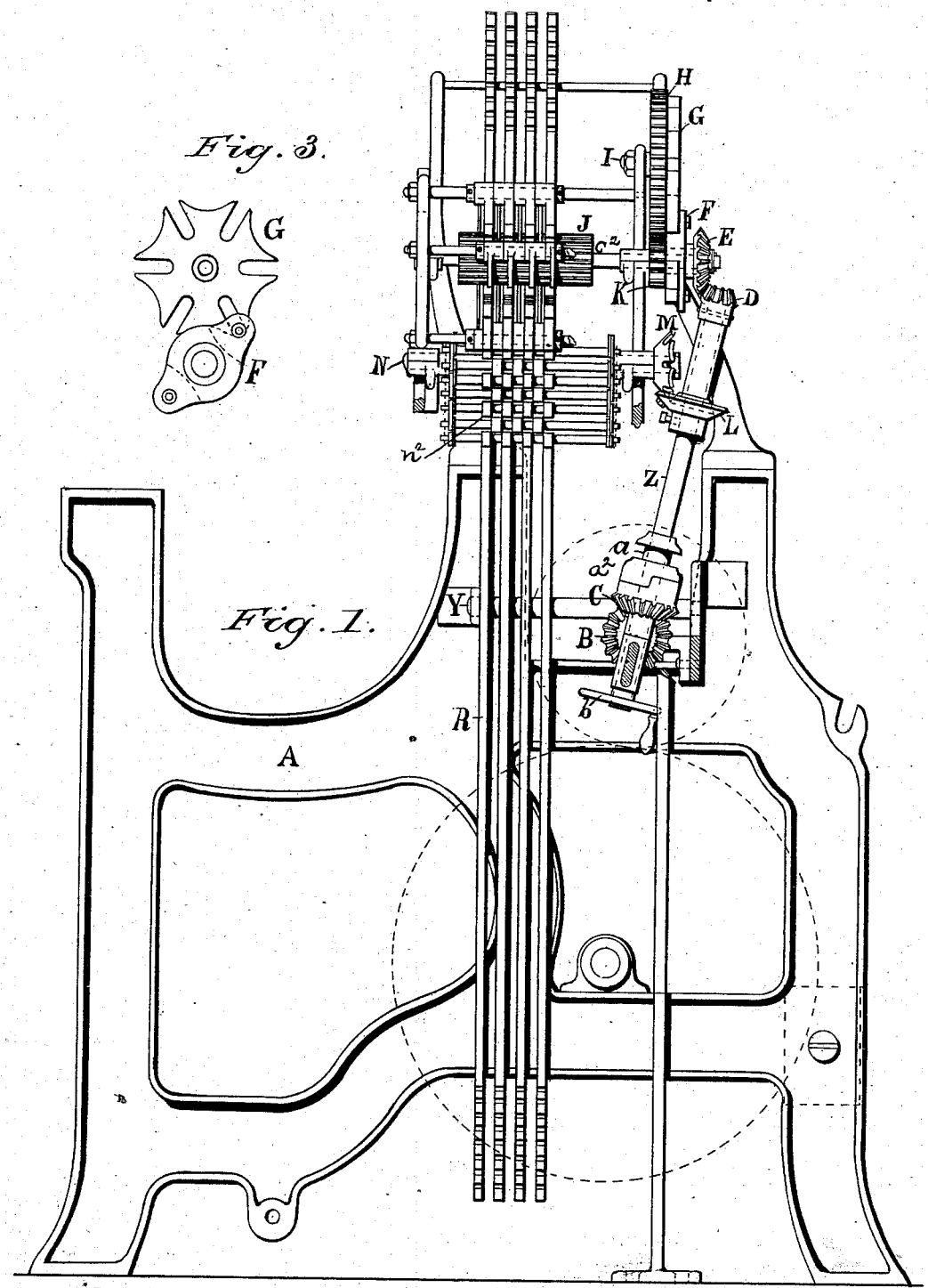

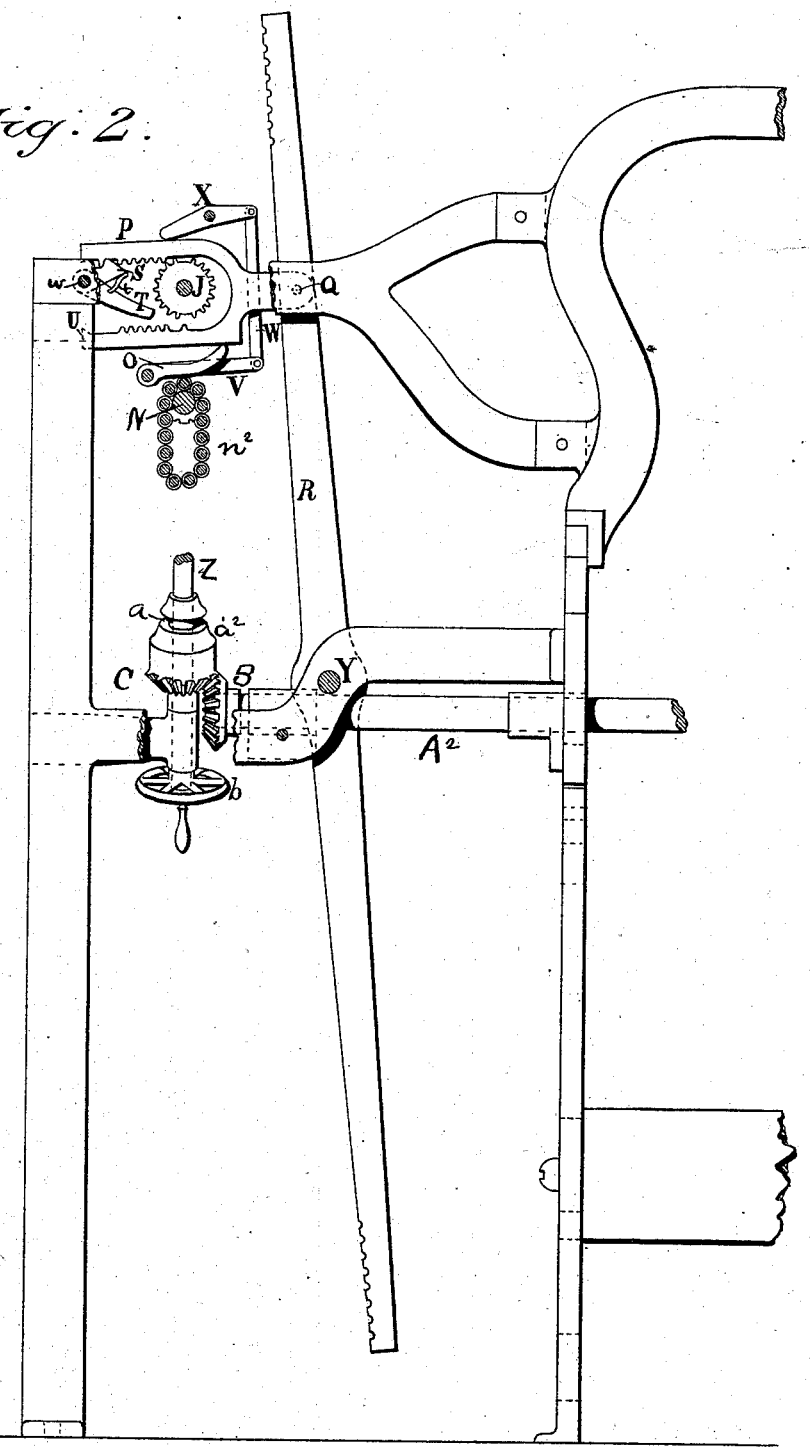

UNITED STATES PATENT OFFICE.

GEORGE CROMPTON, OF WORCESTER, MASSACHUSETTS.

SHEDDING MECHANISM FOR LOOMS.

SPECIFICATION forming part of Letters Patent No. 239,939, dated April 12, 1881.

Application filed June 7, 1880. (No model.)

*To all whom it may concern:*

Be it known that I, GEORGE CROMPTON, of Worcester, county of Worcester, State of Massachusetts, have invented an Improvement in Shedding Mechanisms for Looms, of which the following description, in connection with the accompanying drawings, is a specification.

This invention relates to improvements in open-shed looms, and is shown as applied to a loom having upright heddle-levers, substantially such as represented in United States Patent No. 9,377, November 2, 1852, granted to Greenhalgh; but it will be understood that these upright levers may, if desired, be as shown in United States Patents Nos. 51,928 and 140,476, granted to me, the said levers being notched at bottom and top to permit the adjustment of the harness-cords thereon to elevate or depress the harness-frames for a greater or less distance. These upright levers have connected with them certain notched or toothed jacks, which are operated by a single toothed cylinder to move them and the levers backward and forward. With the said devices I have added or combined a system of toothed gearing, whereby I am enabled to actuate the jack-operating toothed cylinder and usual crank-shaft positively in unison, rather than by a pawl and ratchet or by a belt contrivance, as I have recently learned has been done. The toothed cylinder, which moves the double-racked jacks and levers to their extreme positions in either direction, is moved forward in one direction, and as it engages one or the other rack of the jack moves the latter and its heddle-lever. The teeth on the arms of each racked jack run out of mesh with the teeth of the cylinder as a jack reaches the end of its movement or chase in each direction, after which each jack and its connected heddle-lever is held or locked in one or the other of its extreme positions by suitable catches or locking devices until, by a movement of the pattern-cylinder, the said jacks are released, to be again engaged by the cylinder and returned to their extreme opposite positions.

In this my invention the notched jacks extended horizontally from the upright levers over a pattern-chain are positively raised and lowered by means of lifting and depressing devices. (Shown as fingers.)

Figure 1 of the drawings represents, in elevation, a series of upright heddle-levers, double-racked jacks, and their operating parts, sufficient to illustrate my invention, the view being supposed to be taken from the left-hand end of the loom. Fig. 2 is a side elevation of one of the said upright heddle-levers, its racked jack, and means to actuate it, and part of the lay or crank-shaft and upright clutch or shedding shaft to turn the toothed cylinder which actuates the jacks and levers and pattern chain or surface. Fig. 3 is a detail of the star or pin wheel in the cylinder-driving train of gearing.

The frame-work of the loom is as usual. The crank-shaft $A^2$ extends across the loom-frame, as in Fig. 2, is driven as in either of the said patented looms, and has upon it a bevel-gear, B, which gears with the bevel-gear C upon an upright or shedding shaft, Z, having at its top a bevel-gear, D, in mesh with a bevel-gear, E, loose on the shaft of the toothed cylinder J. The gear E has connected with it, as herein shown, a pin-wheel, F, the pins of which alternately enter one of the slots of the star-wheel G, (shown clearly in Fig. 3,) placed on pivot I. This star-wheel G has fixed to it the pinion H, also sustained by the pivot I, which engages a smaller pinion, K, secured to the shaft $c^2$ of the toothed cylinder J, the latter serving both as an elevator and depressor for the double-racked jacks, between the forked arms of which it is placed. By this train of gearing from the crank-shaft the toothed cylinder J is driven positively without loss of motion, which would not be the case were the shaft of the cylinder J driven by a belt; for, with a belt there is always more or less slipping or lost motion between it and the parts driven by it, which cannot be permitted in a loom where the different parts are obliged to operate one after another or in a certain definite order of time with relation to each other during each rotation of the usual crank-shaft.

The upright shaft Z has a pin-wheel, L, which intermittingly turns the crown-wheel M, secured upon the end of the pattern-cylinder N, carrying the usual pattern-chain $n^2$, it having a longitudinal series of rolls and spaces for each of the fingers O and V, each of said longitudinal series constituting a path of pattern chain or surface.

One-half revolution of F turns G one-sixth of a revolution, and through gears H and K revolves the cylinder J one-half revolution, and moves each jack and lever in connection therewith from one to its other extreme position.

The series of upright heddle-levers R are mounted side by side on the pin Y, supported by the usual stationary frame-work of the loom.

Each double-racked jack P is pivoted upon an upright lever at Q, and the two racked arms of each jack are located in the same vertical plane, or one immediately above the other. With each racked jack is a lifting-finger, O, resting directly upon the pattern-chain $n^2$ or its rolls. A finger, O, elevated by the said rolls, lifts the lowermost arm of the racked jack, and places it in engagement with the toothed cylinder J, so that the latter in its rotation moves the jack and its connected heddle-lever in the direction to lower a harness-frame connected with it; while, when the uppermost arm of a racked jack is so engaged with the cylinder, the finger O below it then being lowered, the heddle-lever connected with such racked jack will be moved in the opposite direction, as in Fig. 2.

To secure the accurate meshing of the racks with the toothed cylinders at the proper places I have removed or omitted a tooth from diametrically opposite sides of the cylinder along the line of its axis, and also the second tooth from the left-hand end of the upper arm of the double-racked jack and the second tooth from the right-hand end of the lower arm of the said jack, as shown in Fig. 2. Each of the said two single or solitary teeth so left on the jack and separated from the other teeth, as described, will, in meshing with the said cylinder, strike into one of its vacant spaces, thus always insuring the meshing of the teeth of the racks of the jacks at the same points on the cylinder when the said racks are thrown in contact therewith. The untoothed spaces of the toothed cylinder permit the toothed parts of the jacks to run out or unmesh from the teeth of the cylinder at the termination of each outward and inward movement. When the upper end of the upright lever is moved outward, as in Fig. 2, one of the teeth of the jack connected with it is caught by a catch, S, which acts to hold the said jack and lever until it is again to be moved in the opposite direction. When the jack is lifted from the position Fig. 2 so that the teeth of its lower arm are engaged with the cylinder, it moves the lever toward the right, and the jack, when moved fully to the right, is engaged at its end U by the prong T.

Catch S and prong T, held in engagement with the jacks, as hereinafter described, act to retain the levers in position to keep the shed open until the pattern-chain again designates the release of the said jacks.

One path of the pattern-chain acts upon the finger O to lift the lower arm of the jack into engagement with the cylinder J and keep it so engaged, while an adjacent path of the chain acts on a lever, V, and lifts it, causing its link W to turn the depressing-finger X, so that its front end in contact with the top of the jack will depress the latter, causing the teeth of the upper arm of the jack to engage the said cylinder J and remain in engagement until again to be lifted by the finger O.

When the lever V is lifted by a roll the companion finger O must rest on a tube of the chain, and vice versa.

When the teeth of the jack are in mesh with the teeth of the cylinder, and the latter is moving the jacks and levers, the jacks and cylinder are by these levers V and fingers O held positively in engagement. The jacks, as they rise and fall, are removed from contact with their holding catches and prongs.

I am aware that it is not new to employ with a vertically-placed notched jack an endless band or chain carrying an elevator or depressor bar, the chain having a continuous motion, and to employ with the said jacks catches to hold them, the said catches operating upon the outer sides of the jacks.

The bevel-gear C on the shaft Z is made to form part of a clutch, $a^2$, as in United States Patent No. 195,686, September 25, 1877, to which reference may be had. The clutch having been unclutched, as in the said patent, I am enabled by the hand-wheel $b$ to turn the shaft Z and pattern-cylinder, and, in unison with it, also turn the toothed cylinder J, and make sheds without moving the crank-shaft, thus enabling me to find a mispick, as described in the said patent. The part $a^2$, which is shouldered, as shown in Fig. 1, to engage the shouldered part of the gear C, the upper part of which forms part of the clutch $a^2$, has a groove, $a$, which is to receive a lever, by which to disengage part $a^2$ from gear C, all as in the said patent.

In the loom herein described the toothed cylinder J, for moving the double-racked jacks and the pattern chain or surface, to determine the times of engagement of one or the other of the racks of the jack with the toothed cylinder to form sheds, as indicated by the pattern-chain, derive their movement from the shedding-shaft Z and the intermediate gearing hereinbefore described, and consequently the said cylinder and pattern-surface will always be moved positively by the said shaft and at one operation on the part of the weaver; and when the said shaft is disconnected from the crank-shaft and the lay is at rest the toothed cylinder and pattern chain or surface may be quickly turned independently of the rest of the loom to find a mispick. Were it not for the shaft Z and the intermediate gearing to operate as described it would be necessary, when finding a mispick, to first turn the toothed cylinder and then the pattern-chain by hand. Hence the said shaft and intermediate gearing become essential elements in my improved loom and add greatly to its efficiency and certainty of operation.

The catches T S are held loosely on the rod $w$ side by side. One catch of each pair of catches carries a spring, $t$, the free end of which rests against the other catch. Catch T may descend into the position Fig. 2, and the catch S engaging the upper rack, the spring $t$ is somewhat strained and straightened from its normal condition. When the catch S holds the jack the catch T is in its lowest position.

If the jack be elevated to place the solitary tooth at the right of its lower arm into engagement with the toothed cylinder J, the upper arm of the jack will be lifted from the catch S, and the lower arm of the jack will lift the catch T from its position in Fig. 2 a distance equal to at least the height of the teeth of the jack, and so hold it that when the jack is fully moved to the right the catch T will fall sufficiently by gravity to engage the end U of the jack and hold it in place. With the jack fully to the right, the depressing device X at the proper time will act on the upper arm of the jack and depress it far enough to carry the end U of the lower arm of the jack below the end of catch T, which will be arrested at its low point.

The upper or hooked end of the catch S will by the spring $t$ be held in the plane of the base of the teeth of the upper arm of the jack when the jack is placed in engagement with the upper side of the toothed cylinder, and as the first tooth at the left-hand end of the jack strikes the catch S it will depress the latter and the spring $t$; but as soon as the said tooth passes the catch S the latter will be lifted by the spring $t$ and engage the said tooth at its rear side and hold the jack, as in Fig. 2.

I claim—

1. The combination, in a loom, of an upright harness-operating lever, a double-racked jack pivoted thereon and extended horizontally therefrom over the pattern chain or surface, a pattern-chain to determine the elevation and depression of the said jack, the rotating cross-shaft $A^2$ of the loom, and a toothed cylinder, located between the arms of the double-racked jack, with the upright shaft Z, clutch $a^2$, and toothed gearing intermediate between the said shaft $A^2$, shaft Z, and the toothed cylinder and pattern-chain shafts, adapted to positively rotate the said toothed cylinder and pattern-chain shafts and pattern-chain in unison with the shaft $A^2$ when the clutch is engaged, and independently of the said shaft when the latter is at rest, the said parts being combined and operating substantially as described.

2. The upright harness-operating lever and its connected double racked or toothed jack pivoted thereto and extended horizontally out over the pattern-chain, and the pattern-chain, toothed cylinder J, a finger to lift the jack into engagement with the cylinder and hold it engaged while the jack is moved in one direction, and a disengaging-finger to depress the jack and hold it in engagement with the cylinder J while the rack is being moved by it, combined with toothed gearing and shafting to rotate both the pattern-chain and toothed cylinder, substantially as described.

3. In a loom, the upright heddle-lever, the notched horizontally-extended jack, the toothed cylinder, located between the arms of the jack, the pattern-chain, a lifting-finger to lift the jack, a depressing-finger to depress the jack, means between said depressing-finger and the pattern-chain to depress its forward end, and catches to engage the jack in each of its extreme positions and hold it until the jack is again positively raised or lowered, combined with toothed gearing and shaft to positively actuate both the pattern-chain and the toothed cylinder, substantially as and for the purpose described.

4. A heddle-lever and double-racked jack provided with solitary teeth separated from the series of teeth of the racks of the jack, combined with the cylinder J, provided with diametrically opposite untoothed spaces to operate as described, and with means to operate the cylinder and place the racks of the jack in engagement with the cylinder at the proper times.

5. The combination, in a loom, of these elements: a series of upright heddle-levers adapted to be connected at bottom and top by cording with the harness-frames, a toothed cylinder, a series of double-racked jacks pivoted directly upon the heddle-levers and embracing the toothed cylinder, the rotating loom-shaft $A^2$, shedding-shaft moved by it, and a system of toothed gearing, substantially as described, driven by the shedding-shaft, whereby the toothed cylinder is moved a semi-revolution at each revolution of the shaft $A^2$, and operates positively in one or the other direction the jacks, the teeth of which are in mesh with the toothed cylinder, and with them their connected heddle-levers, substantially as set forth.

In testimony whereof I have signed my name to this specification in the presence of two subscribing witnesses.

GEORGE CROMPTON.

Witnesses:
J. B. SYME,
J. A. WARE.